US012791870B2

(12) United States Patent
Peng et al.

(10) Patent No.: US 12,791,870 B2
(45) Date of Patent: Nov. 10, 2026

(54) DRIVING MECHANISM

(71) Applicant: Actutek Corporation, Taoyuan City (TW)

(72) Inventors: Chun-Chia Peng, Taoyuan City (TW); Po-Xiang Zhuang, Taoyuan City (TW); Wei-Jhe Shen, Taoyuan City (TW); Yi-Ho Chen, Taoyuan City (TW); Ko-Lun Chao, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 347 days.

(21) Appl. No.: 18/600,090

(22) Filed: Mar. 8, 2024

(65) Prior Publication Data

US 2024/0302672 A1 Sep. 12, 2024

Related U.S. Application Data

(60) Provisional application No. 63/489,515, filed on Mar. 10, 2023.

(51) Int. Cl.
*G02B 27/64* (2006.01)

(52) U.S. Cl.
CPC .................................. *G02B 27/646* (2013.01)

(58) Field of Classification Search
CPC ........ G02B 27/64; G02B 27/646; G02B 7/09; G02B 26/08; G02B 26/0816; G02B 26/0833; G02B 26/085; G02B 26/10; G02B 26/101; G02B 26/105; G02B 26/108; H02K 33/18; G03B 5/00; G03B 13/36; G03B 30/00; G03B 2205/0069; H04N 23/50; H04N 23/55; H04N 23/57; H04N 23/687
See application file for complete search history.

(56) References Cited

U.S. PATENT DOCUMENTS

| | | | | |
|---|---|---|---|---|
| 2015/0042977 A1* | 2/2015 | Siercks | ................. | G01S 7/4817 356/4.01 |
| 2019/0230262 A1* | 7/2019 | Wang | ........................ | G03B 5/02 |
| 2020/0225442 A1* | 7/2020 | Weng | ...................... | H04N 23/55 |
| 2022/0397808 A1* | 12/2022 | Yedid | ...................... | G03B 17/17 |
| 2024/0297560 A1* | 9/2024 | Peng | ......................... | G02B 7/02 |

* cited by examiner

*Primary Examiner* — Stephone B Allen
*Assistant Examiner* — Adam W Booher
(74) *Attorney, Agent, or Firm* — MUNCY, GEISSLER, OLDS & LOWE, P.C.

(57) ABSTRACT

A driving mechanism for moving an optical element is provided. The driving mechanism includes a fixed part, a movable part, and a driving assembly. The movable part is movably connected to the fixed part for holding the optical element. The driving assembly is configured for moving the movable part relative to the fixed part.

17 Claims, 6 Drawing Sheets

DRIVING MECHANISM

CROSS REFERENCE TO RELATED APPLICATIONS

This application claims the benefit of U.S. provisional application No. 63/489,515, filed Mar. 10, 2023, the entirety of which is incorporated by reference herein.

BACKGROUND OF THE INVENTION

Field of the Invention

The present invention relates to a driving mechanism, and, in particular, to a driving mechanism for moving an optical element.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, several coils and magnets are usually used for adjusting the focus of a lens. However, miniaturization of the electronic devices may increase the difficulty of mechanical design, and it may also lead to low reliability and a low positioning accuracy of the driving mechanism. Therefore, addressing the aforementioned problems has become a challenge.

BRIEF SUMMARY OF THE INVENTION

An embodiment of the present invention provides a driving mechanism for moving an optical element. The driving mechanism includes a fixed part, a movable part, and a driving assembly. The movable part is movably connected to the fixed part for holding the optical element. The driving assembly is configured for moving the movable part relative to the fixed part.

In some embodiments, the driving mechanism further includes a rotary member pivotally connected to the movable part, wherein the optical element is disposed on the rotary member, the driving assembly drives the movable part to rotate relative to the fixed part around a first axis and drives the rotary member to rotate relative to the movable part around a second axis, and the first axis is not parallel to the second axis.

In some embodiments, the first axis and the center of the optical element have a first distance, the second axis and the center of the optical element have a second distance, and the first distance is longer than the second distance.

In some embodiments, when viewed along the first axis, the first axis does not extend through the optical element.

In some embodiments, when viewed along the first axis, the second axis extends through the optical element.

In some embodiments, wherein the second axis is perpendicular to the first axis.

In some embodiments, the driving mechanism further includes a hinge pivotally connecting the movable part to the fixed part, wherein the fixed part forms a slot, and the hinge is rotatably received in the slot.

In some embodiments, the driving mechanism further includes a ball, wherein the movable part forms a cavity, and the rotary member has a main body and a sleeve portion protruding from the main body, wherein the ball is received in the cavity and connected to the sleeve portion.

In some embodiments, when viewed in a first direction or a second direction, the sleeve portion do not overlap the main body, wherein the first direction, the second direction, and the second axis are perpendicular to each other.

In some embodiments, the cavity is recessed in a first direction that is perpendicular to the first axis and the second axis.

In some embodiments, the driving mechanism further includes a resilient element connected between the fixed part and the movable part, wherein the resilient element exerts a first main preload force on the movable part.

In some embodiments, the driving mechanism further includes a rotary member pivotally connected to the movable part, wherein the optical element is disposed on the rotary member, the driving assembly drives the movable part to rotate relative to the fixed part around a first axis and drives the rotary member to rotate relative to the movable part around a second axis, and the first axis is not parallel to the second axis.

In some embodiments, when viewed along the first axis, the movable part protrudes more than the fixed part on a front side of the driving mechanism.

In some embodiments, the movable part forms a nub, and the fixed part forms a rib, wherein the resilient element connects the nub to the rib, and the nub protrudes more than the rib on the front side of the driving mechanism.

In some embodiments, the first main preload force is perpendicular to the first and second axes.

In some embodiments, the resilient element is connected to the rotary member, and when viewed along the second axis, the rotary member protrudes more than the movable part on a front side of the driving mechanism, and the resilient element exerts a first auxiliary preload force on the rotary member.

In some embodiments, the movable part forms a nub, and the rotary member forms a protrusion, wherein the resilient element connects the nub to the protrusion, and the protrusion protrudes more than the nub on the front side of the driving mechanism.

In some embodiments, the first auxiliary preload force is perpendicular to the first and second axes.

In some embodiments, the resilient element comprises a metal spring sheet extending across the movable part and a rotary member.

In some embodiments, the driving mechanism further includes a damping element disposed on the resilient element.

In some embodiments, the damping element is connected to at least one of the fixed part, the movable part, and the rotary member.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
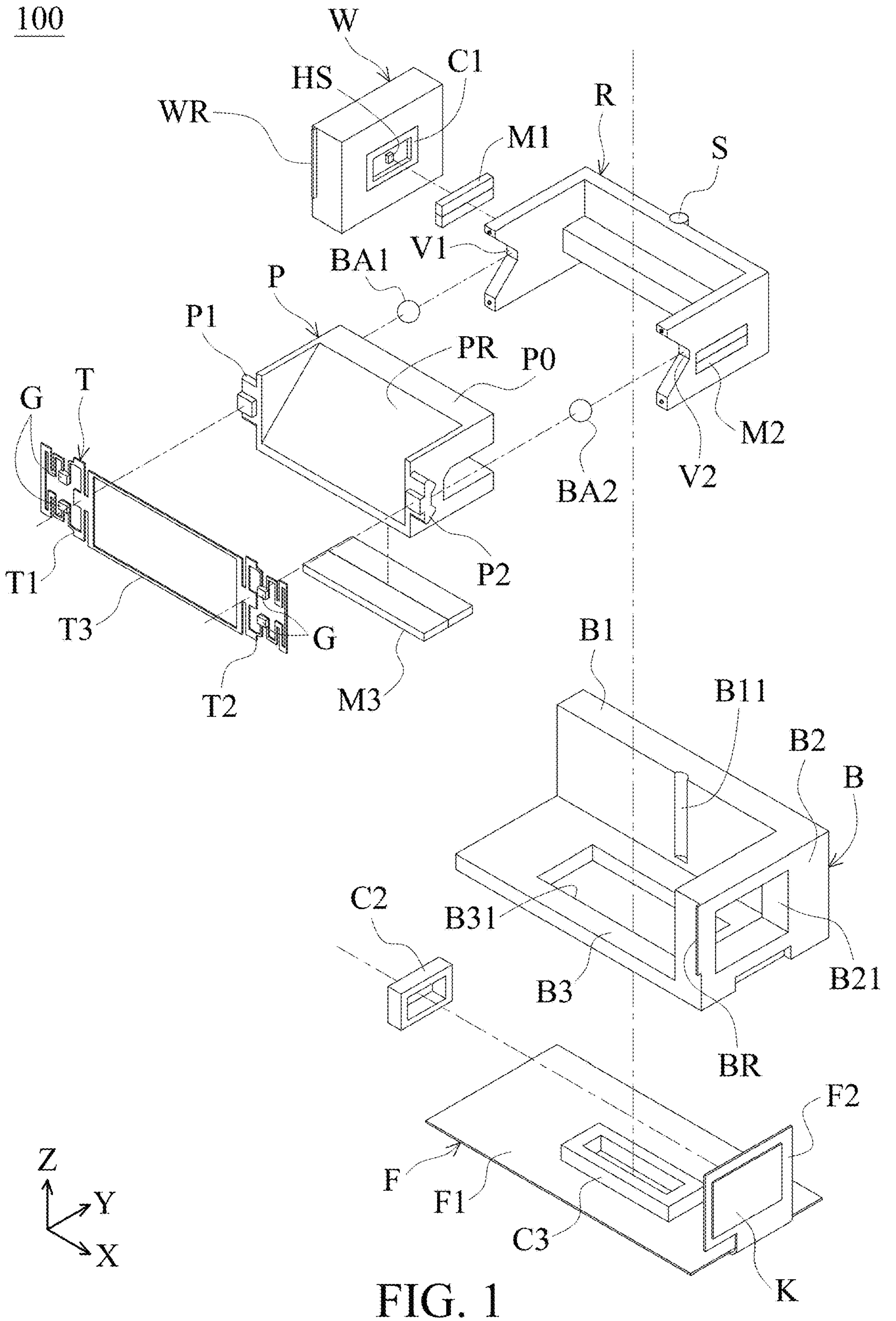
FIG. 1 shows an exploded view of a driving mechanism 100 in accordance with an embodiment of the invention.
Figure 2:
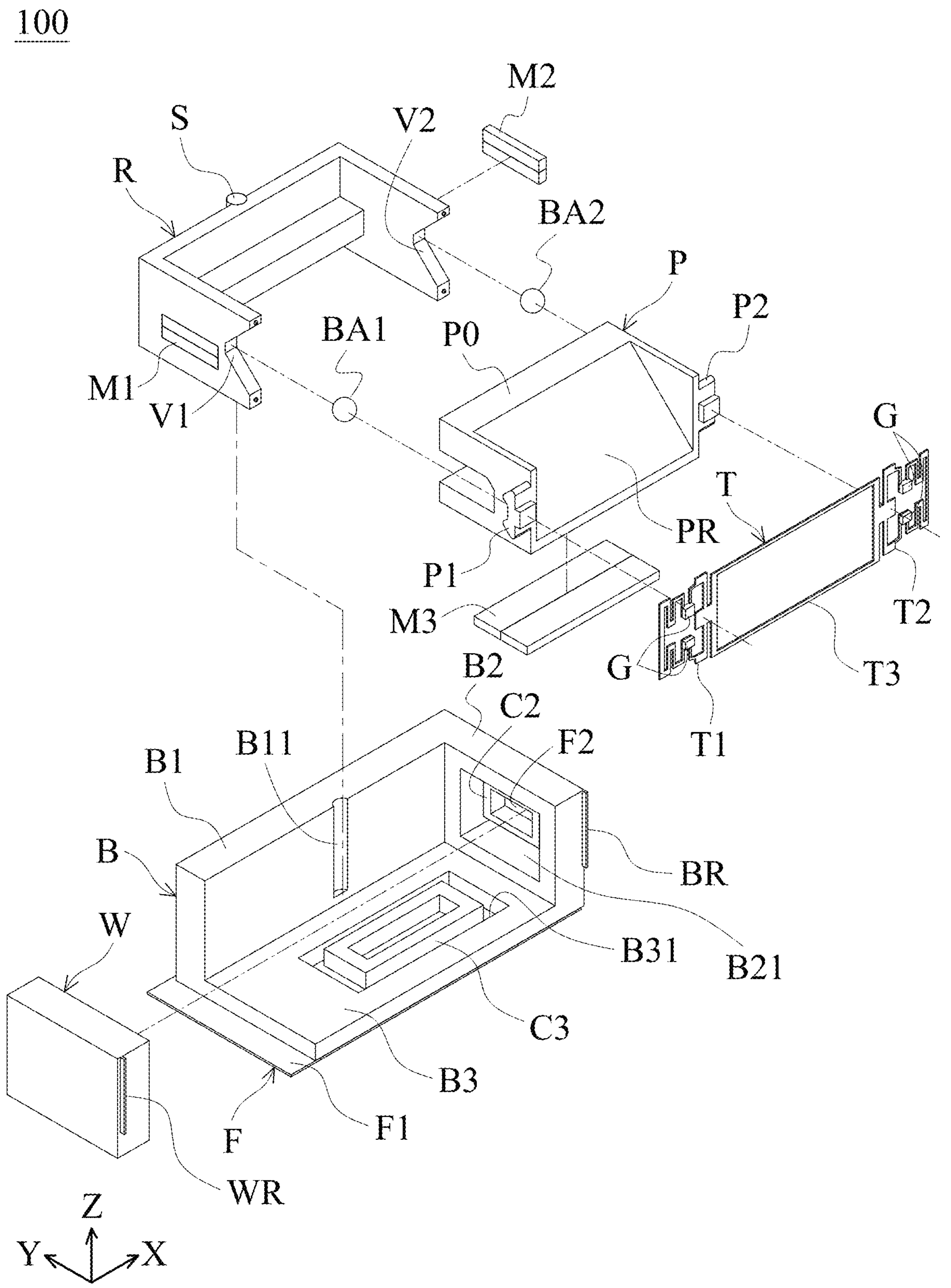
FIG. 2 shows another exploded view of the driving mechanism 100 in FIG. 1.
Figure 3:
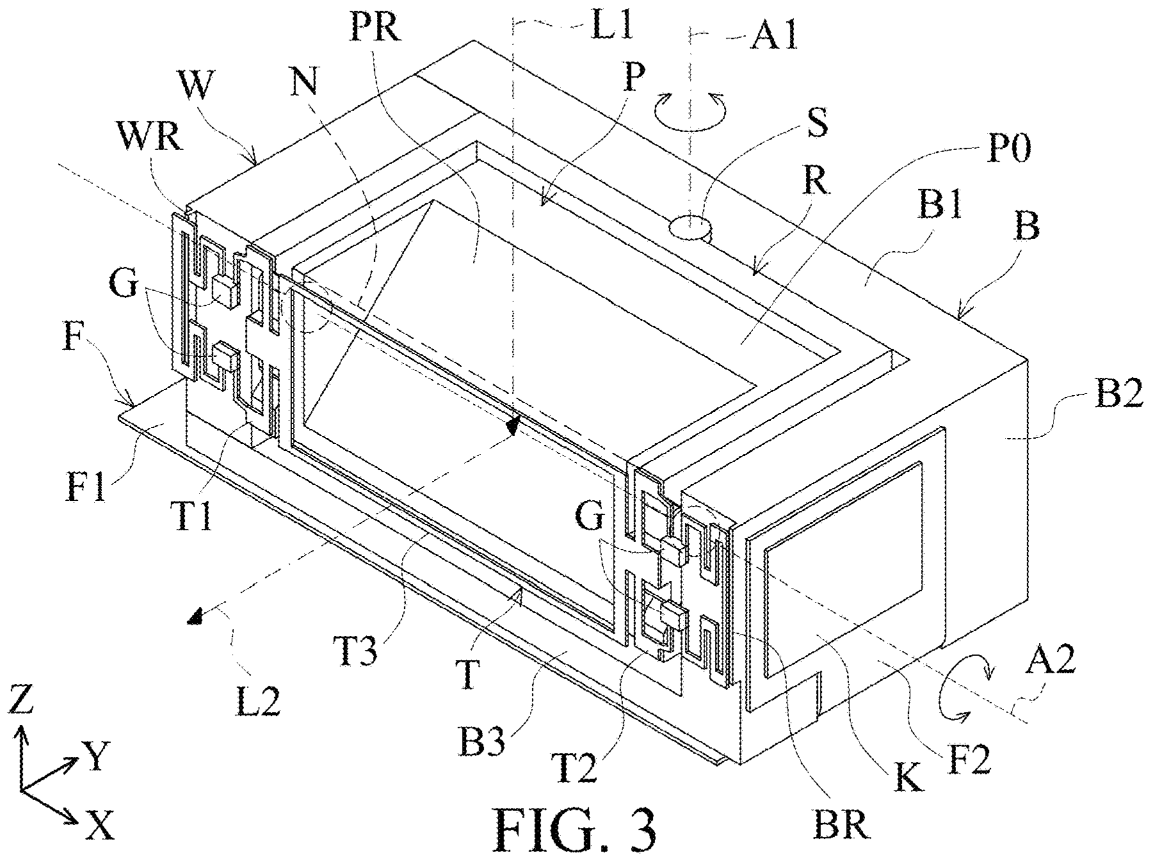
FIG. 3 shows a perspective diagram of the driving mechanism 100 in FIGS. 1 and 2 after assembly.
Figure 4:
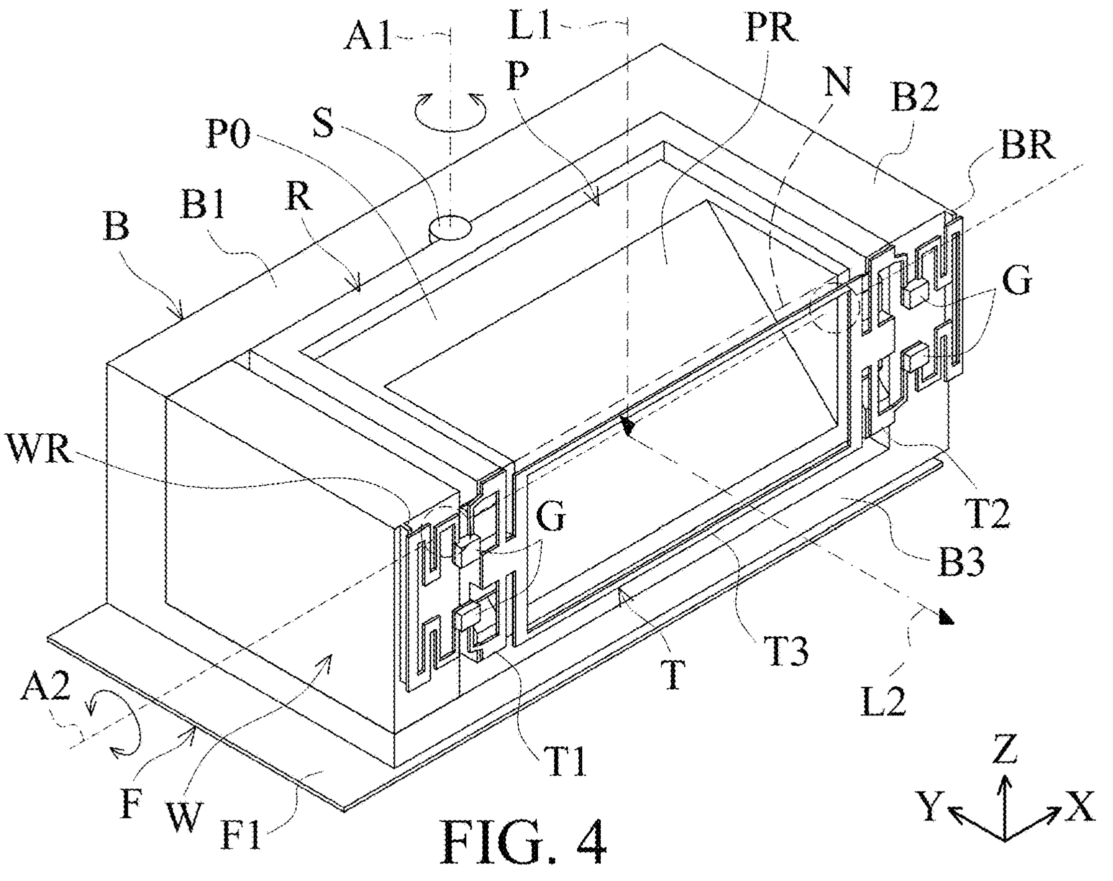
FIG. 4 shows another perspective diagram of the driving mechanism 100 in FIGS. 1 and 2 after assembly.

FIG. 1 shows an exploded view of a driving mechanism 100 in accordance with an embodiment of the invention. FIG. 2 shows another exploded view of the driving mechanism 100 in FIG. 1. FIG. 3 shows a perspective diagram of the driving mechanism 100 in FIGS. 1 and 2 after assembly. FIG. 4 shows another perspective diagram of the driving mechanism 100 in FIGS. 1 and 2 after assembly.

Referring to FIGS. 1-4, the driving mechanism 100 in this embodiment is a Voice Coil Motor (VCM) which may be disposed in a cell phone or other portable electronic device for driving an optical element (e.g. the prism N shown in FIGS. 3 and 4) of a periscope lens module to move, thereby achieving the function of Optical Image Stabilization (OIS).

The driving mechanism 100 primarily comprises a plastic base B, a circuit assembly F, a movable part R, a rotary member P, a plate member W, a hinge S, a first magnetic element M1, a second magnetic element M2, a third magnetic element M3, a first driving element C1, a second driving element C2, a third driving element C3, a sensor HS, two balls BA1, BA2, and a resilient element T.

The hinge S is affixed to the movable part R and pivotally connected to the base B. The balls BA1 and BA2 are used to pivotally connect the rotary member P with the movable part R. In this embodiment, the hinge S extends in the Z direction and is located between the two balls BA1 and BA2 along the X axis.

The circuit assembly F may comprise a flexible circuit board that has a first segment F1 and a second segment F2. The second segment F2 is foldable relative to the first segment F1, and a magnetic permeable element K is disposed on the outer surface of the second segment F2, as shown in FIGS. 1 and 3.

It should be noted that a slot B11 is formed on the first wall B1 of the base B for receiving the hinge S. Additionally, the plate member W is disposed on the base B and has an inner surface facing the movable part R, wherein a recess is formed on the inner surface of the plate member W. The recess is depressed in the −X direction for receiving the first driving element C1 and the sensor HS (e.g. Hall effect sensor).

The second driving element C2 is disposed on the second segment F2 of the circuit assembly F and received in the opening B21 on the second wall B2 of the base B. The third driving element C3 is disposed on first segment F1 of the circuit assembly F and received in the opening B31 on the bottom portion B3 of the base B.

Here, the first wall B1, the second wall B2, and the bottom portion B3 are perpendicular to each other. The first and second segments F1 and F2 of the circuit assembly F are respectively mounted on the bottom portion B3 and the second wall B2 of the base B. The plate member W is connected to the bottom portion B3 and the first wall B1 of the base B. Moreover, the rotary member P and the movable part R are accommodated in the space between the plate member W and the second wall B2 of the base B after assembly.

The first, second, and third driving elements C1, C2, and C3 may comprise coils, and the first, second, and third magnetic elements M1, M2, and M3 may comprise permanent magnets. The first and second magnetic elements M1, M2 are disposed on opposite sides of the movable part R and respectively face the first and second driving elements C1 and C2. The third magnetic element M3 is disposed on the bottom side of the movable part R and faces the third driving element C3.

In this embodiment, the base B and the plate member W form a fixed part of the driving mechanism 100. The first, second, third driving elements C1, C2, C3 and the first, second, third magnetic elements M1, M2, M3 constitute a driving assembly for rotating the rotary member P and the movable part R within a predetermined angle range.

An electromagnetic force can be generated by the first and second coils C1, C2 and the first and second magnetic elements M1, M2 to rotate the movable part R relative to the fixed part (the plate member W and the base B) around the first axis A1, as shown in FIGS. 3 and 4. Moreover, the third coil C3 and the third magnetic element M3 can generate an electromagnetic force to rotate the rotary member P relative to the movable part R around the second axis A2. Here, the first axis A1 is substantially parallel to the Z axis, and the second axis A2 is substantially parallel to the X axis.

In some embodiments, the prism N (FIGS. 3 and 4) of the periscope lens module may be disposed on the reflecting surface PR of the rotary member P. Light can enter the prism N along the light-entering direction L1 (−Z direction), and it is then reflected by the reflecting surface PR and leaves the prism N along the light-reflecting direction L2 (−Y direction). With the configuration as described above, the function of Optical Image Stabilization (OIS) can be achieved by the driving assembly promptly adjusting the angle of the prism N.

It should be noted that the hinge S is rotatably received in the slot B11 of the base B. Moreover, the ball BA1 is connected between the sleeve portion P1 of the rotary member P and the V-shaped cavity V1 of the movable part R, as shown in FIGS. 1 and 2, and the ball BA2 is connected between the sleeve portion P2 of the rotary member P and the V-shaped cavity V2 of the movable part R. Here, the V-shaped cavities V1 and V2 are recessed in the Y direction (first direction).

Hence, when a current is applied to the coils C1, C2, and C3, the rotary member P and the movable part R can be driven to rotate relative to the fixed part (the plate member W and the base B) around the first axis A1 (FIGS. 3 and 4) via the hinge S. Moreover, the rotary member P can be also driven to rotate relative to the movable part R around the second axis A2 via the balls BA1 and BA2, thereby promptly adjusting the angle of the prism N. It should be noted that the first and second axes A1 and A2 are substantially perpendicular to the Y direction (first direction). When viewed in the Y direction (first direction) or the −Z direction (second direction), the sleeve portions P1 and P2 do not overlap the main body P0 of the rotary member P.

In some embodiments, a magnet (not shown) may be disposed in the first wall B1 of the base B to magnetically attract the metal hinge S, whereby the hinge S can be prevented from separation from the slot B11.

Still referring to FIGS. 1-4, the resilient element T comprises a rectangular spring sheet that is disposed on the front side of the driving mechanism 100 and substantially parallel to the first and second axes A1 and A2. Specifically, the resilient element T extends from the plate member W and across the movable part R and the rotary member P to the second wall B2 of the base B.

The resilient element T primarily comprises a first section T1, a second section T2, and a third second T3. Here, the first section T1 is connected to the plate member W, the movable part R, and the rotary member P. The second section T2 is connected to the second wall B2 of the base B, the movable part R, and the rotary member P. Moreover, the third second T3 has a hollow rectangular frame that is connected between the first and second sections T1 and T2.

Specifically, at least one damping element G is disposed on the first, second or third section T1, T2 or T3. In some embodiments, one or several damping elements G may be connected to at least one of the plate member W, the second wall B2 of the base B, the movable part R, and the rotary member P, thereby enhancing the structural strength of the driving mechanism 100.

It should be noted that the resilient element T can exert a spring force on the movable part R and the rotary member P in the Y direction (first direction), whereby the rotary member P can be stably hinged to the movable part R, and the movable part R can be stably hinged to the base B. Since the rotary member P and the movable part R are restricted in the space between the plate member W and the second wall B2 by the resilient element T, they can be prevented from separation from the fixed part (the plate member W and the base B).

Figure 5:
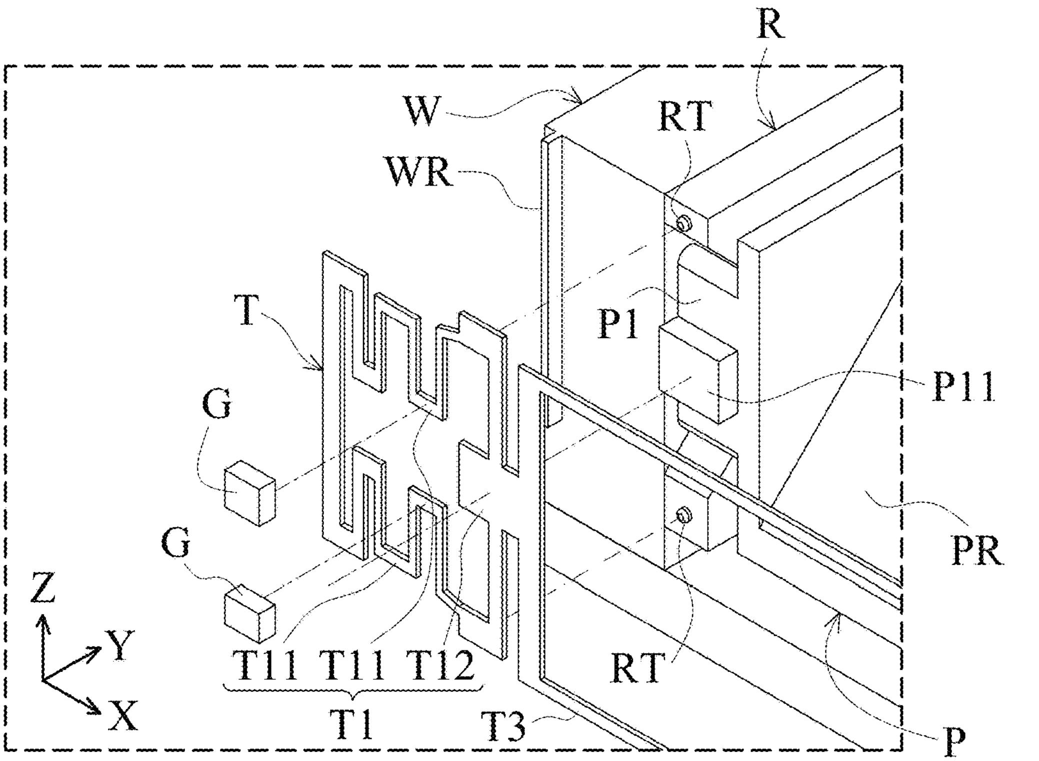
FIG. 5 is an enlarged view of the damping element G and the first section T1 of the resilient element T before assembly.

FIG. 5 is an enlarged view of the damping element G and the first section T1 of the resilient element T before assembly.

Referring to FIG. 5, the first section T1 of the resilient element T comprises two first serpentine springs T11 and a first connecting portion T12 connected between the first serpentine springs T11. An end of each first serpentine spring T11 is adhered to the rib WR of the plate member W, and the other end of each first serpentine spring T11 is adhered to the nub RT of the movable part R. The first connecting portion T12 is connected to the third second T3 and adhered to the protrusion P11 that is formed on the sleeve portion P1 of the rotary member P.

It can be seen in FIG. 5 that two damping elements G (e.g. gel) are disposed on the two first serpentine springs T11 of the first section T1, so as to absorb vibration of the first section T1. The damping elements G can also be used to protect the resilient element T and improve the mechanical properties of the resilient element T.

In some embodiments, one or several damping elements G may be connected to at least one of the plate member W, the movable part R, and the rotary member P, thereby enhancing the structural strength of the driving mechanism 100.

Figure 6:
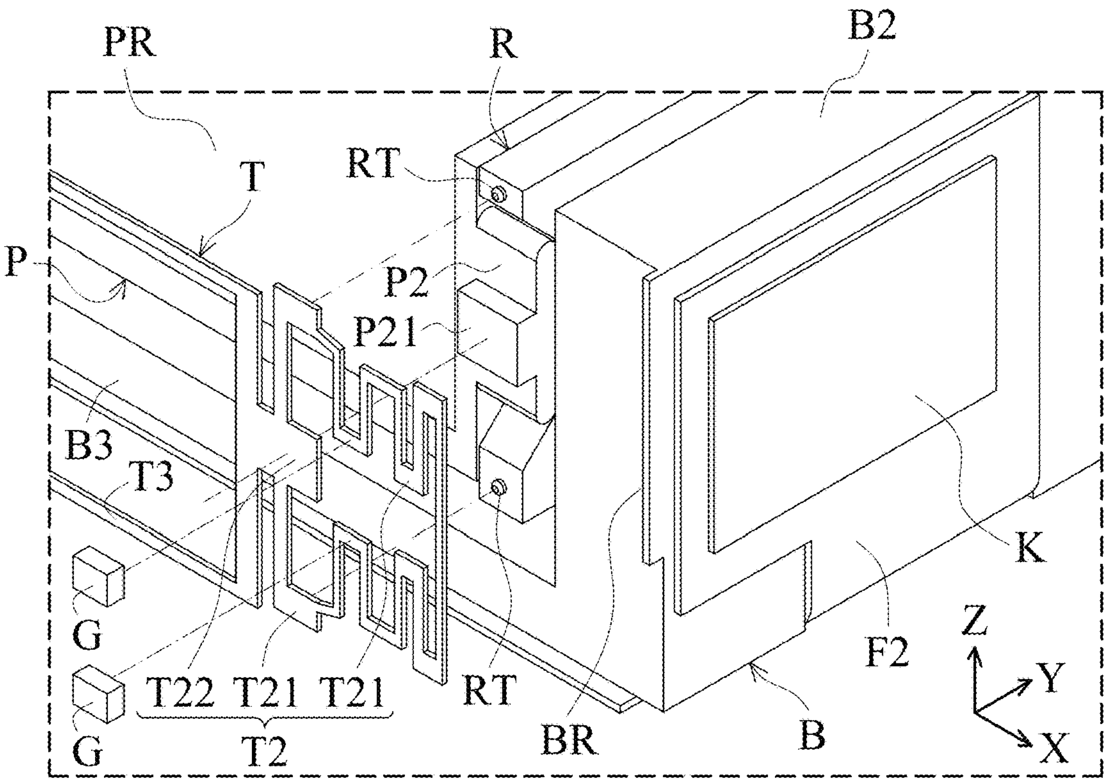
FIG. 6 is an enlarged view of the damping element G and the second section T2 of the resilient element T before assembly.

FIG. 6 is an enlarged view of the damping element G and the second section T2 of the resilient element T before assembly.

Referring to FIG. 6, the second section T2 of the resilient element T comprises two second serpentine springs T21 and a second connecting portion T22 connected between the second serpentine springs T21. An end of each second serpentine spring T21 is adhered to the rib BR formed on the second wall B2 of the base B, and the other end of each second serpentine spring T21 is adhered to the nub RT of the movable part R. The second connecting portion T22 is connected to the third second T3 and adhered to the protrusion P21 that is formed on the sleeve portion P2 of the rotary member P.

It can be seen in FIG. 6 that two damping elements G (e.g. gel) are disposed on the two second serpentine springs T21 of the second section T2, so as to absorb vibration of the second section T2. As described above, the damping elements G are configured to protect the resilient element T and improve the mechanical properties of the resilient element T.

In some embodiments, one or several damping elements G may be connected to at least one of the movable part R, the rotary member P, and the second wall B2 of the base B, thereby enhancing the structural strength of the driving mechanism 100.

Here, the ribs WR, BR, the nub RT, and the protrusions P11, P21 protrude from the plate member W, the movable part R, the rotary member P, and the second wall B2 of the base B toward the resilient element T. Therefore, a gap can be formed between the first and second serpentine springs T11, T21 and the plate member W, the movable part R, the rotary member P, and the second wall B2 along the Y axis.

Figure 7:
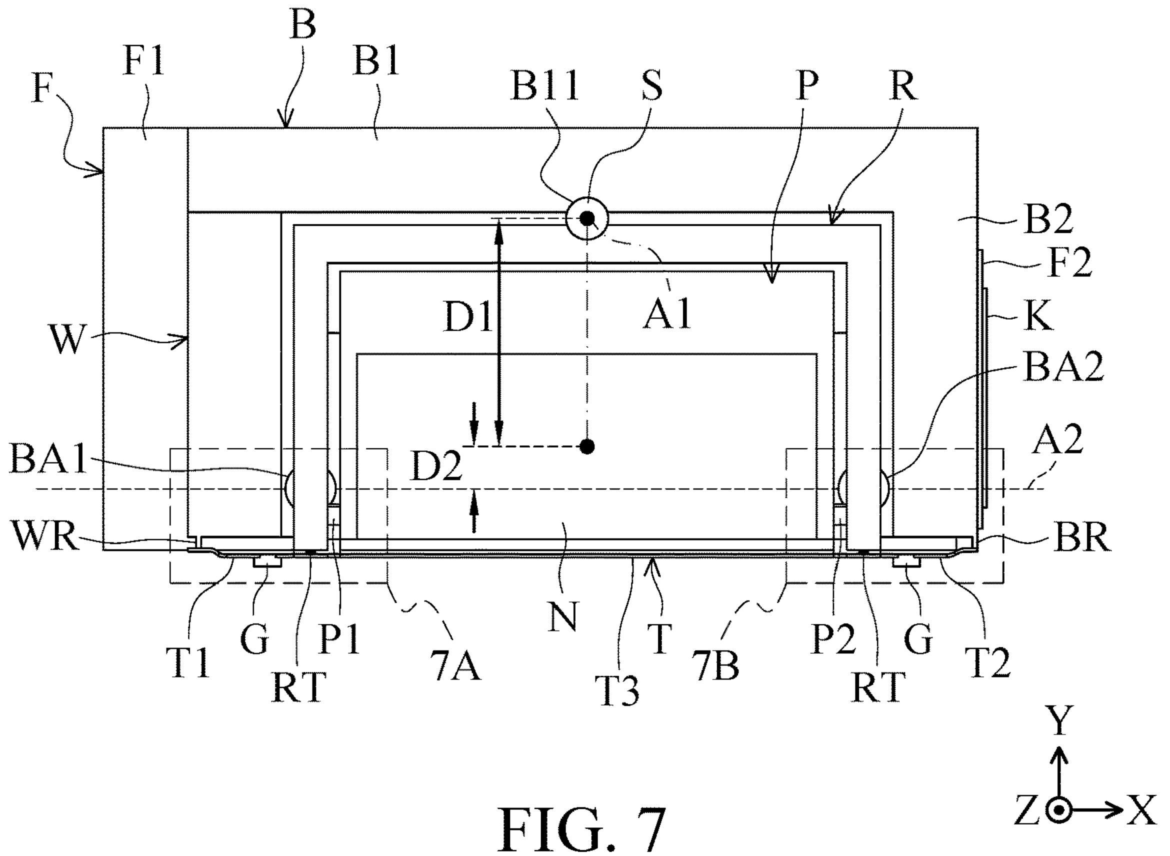
FIG. 7 is a top view of the driving mechanism 100 after assembly.

FIG. 7 is a top view of the driving mechanism 100 after assembly. Referring to FIGS. 3, 4, and 7, the movable part R is rotatable relative to the fixed part (the plate member W and the base B) around the first axis A1 via the hinge S. Additionally, the rotary member P is rotatable relative to the movable part R around the second axis A2 via the two balls BA1 and BA2. In this embodiment, the first axis A1 is substantially parallel to the Z axis, and the second axis A2 is substantially parallel along the X axis.

As shown in FIGS. 3, 4, and 7, when viewed in the −Z direction (the first axis A1), the first axis A1 does not extend through the optical element N. However, the second axis A2 extends through the optical element N.

Furthermore, the first axis A1 and the center of the optical element N have a first distance D1, and the second axis A2 and the center of the optical element N have a second distance D2, wherein the first distance D1 is longer than the second distance D2.

Figure 8:
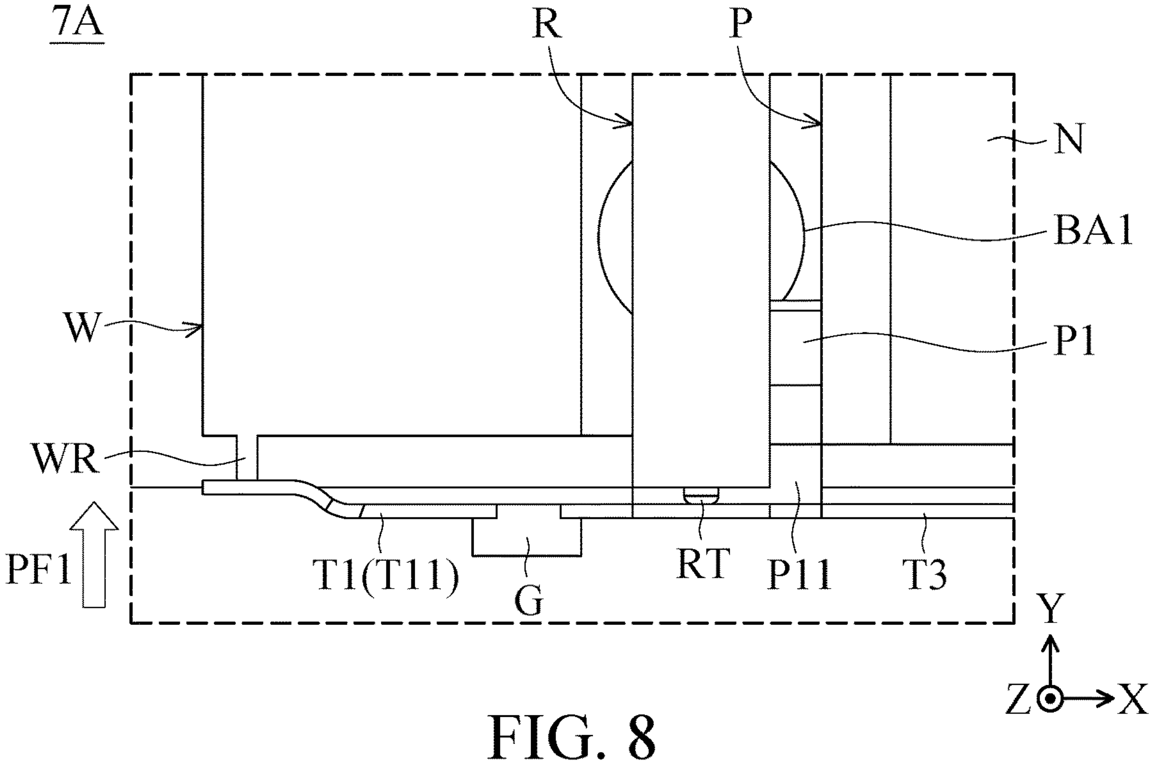
FIG. 8 is an enlarged view of the area 7A in FIG. 7.
Figure 9:
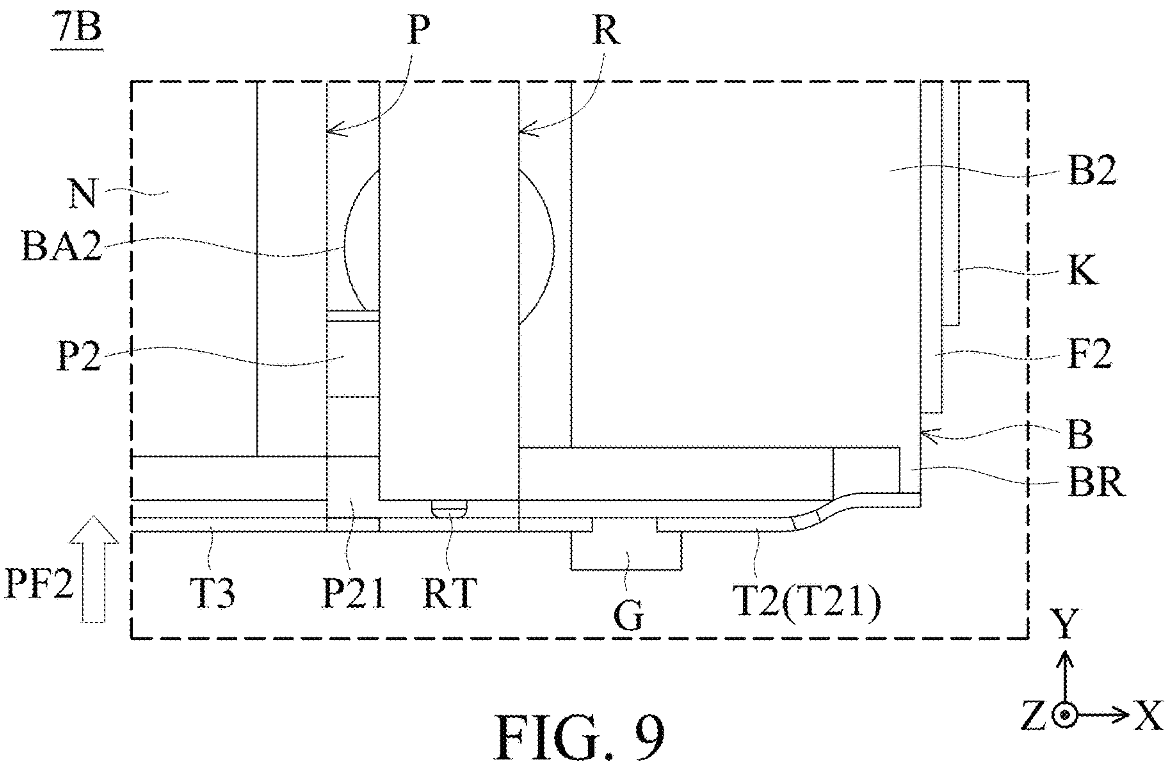
FIG. 9 is an enlarged view of the area 7B in FIG. 7.
Figure 10:
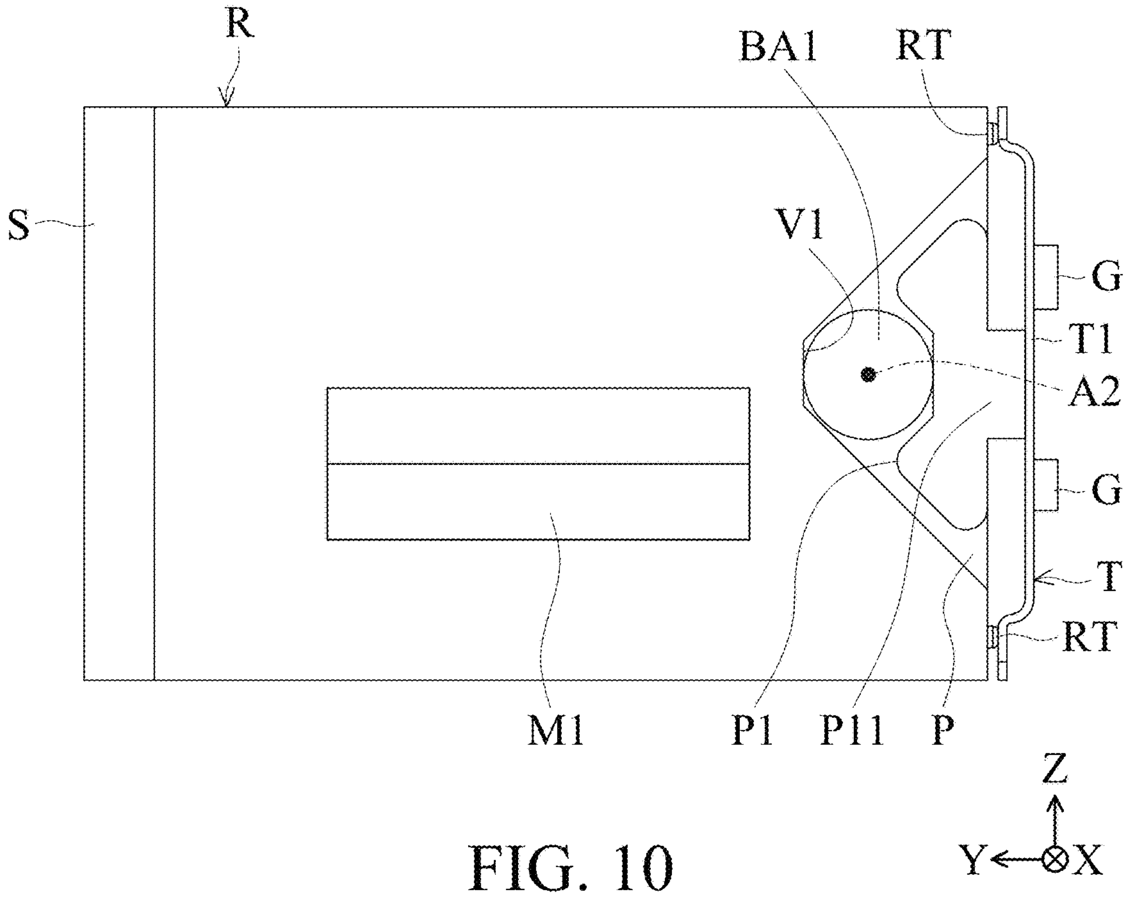
FIG. 10 is a side view of the driving mechanism 100 with the base B, the plate member W, and the circuit assembly F removed therefrom.

FIG. 8 is an enlarged view of the area 7A in FIG. 7. FIG. 9 is an enlarged view of the area 7B in FIG. 7. FIG. 10 is a side view of the driving mechanism 100 with the base B, the plate member W, and the circuit assembly F removed therefrom.

Referring to FIGS. 5 and 8, the first section T1 of the resilient element T is connected to the rib WR of the plate member W, the nub RT of the movable part R, and the protrusion P11 on the sleeve portion P1 of the rotary member P. It can be seen in FIG. 8 that the nub RT protrudes (in the −Y direction) more than the rib WR on the front side of the driving mechanism 100. Thus, the first section T1 of the resilient element T can deform and exert a first main preload force PF1 on the movable part R along the Y direction after assembly, whereby the hinge S can be stably received in the slot B11 of the base B, and miniaturization of the driving mechanism 100 can be also achieved.

In some embodiments, the protrusion P11 of the rotary member P may protrude (in the −Y direction) more than the nub RT on the front side of the driving mechanism 100. Thus, the first section T1 of the resilient element T can deform and exert a first auxiliary preload force on the rotary member P along the Y direction after assembly, whereby the ball BA1 can be stably held between the movable part R and the sleeve portion P1 of the rotary member P.

Similarly, Referring to FIGS. 6 and 9, the second section T2 of the resilient element T is connected to the rib BR on the second wall B2 of the base B, the nub RT of the movable part R, and the protrusion P21 on the sleeve portion P2 of the rotary member P. It can be seen in FIG. 9 that the nub RT protrudes (in the −Y direction) more than the rib BR on the front side of the driving mechanism 100. Thus, the second section T2 of the resilient element T can deform and exert a second main preload force PF2 on the movable part R along the Y direction after assembly, whereby the hinge S can be stably received in the slot B11 of the base B, and miniaturization of the driving mechanism 100 can be also achieved.

In some embodiments, the protrusion P21 of the rotary member P may protrude (in the −Y direction) more than the nub RT on the front side of the driving mechanism 200. Thus, the second section T2 of the resilient element T can deform and exert a second auxiliary preload force on the rotary member P along the Y direction after assembly, whereby the ball BA2 can be stably held between the movable part R and the sleeve portion P2 of the rotary member P.

It should be noted that the first and second main preload forces PF1, PF2 and the first and second auxiliary preload forces are substantially parallel to the Y axis and perpendicular to the first and second axes A1 and A2.

In some embodiments, the third second T3 may be omitted from the resilient element T. Namely, the first section T1 and the second section T2 may be independent resilient components spaced apart from each other, wherein the first section T1 is configured to connect the plate member W and the movable part R (or the rotary member P), and the second section T2 is configured to connect second wall B2 of the base B and the movable part R (or the rotary member P). Hence, the first and second main preload forces PF1, PF2 and the first and second auxiliary preload forces can also be generated, whereby the hinge S can be stably received in the slot B11 of the base B, the balls BA1, BA2 can be stably held between the movable part R and the rotary member P, and miniaturization of the driving mechanism 100 can be also achieved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification.

As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element, comprising:
- a fixed part;
- a movable part, movably connected to the fixed part for holding the optical element;
- a driving assembly, configured for moving the movable part relative to the fixed part;
- a rotary member, pivotally connected to the movable part, wherein the optical element is disposed on the rotary member, the driving assembly drives the movable part to rotate relative to the fixed part around a first axis and drives the rotary member to rotate relative to the movable part around a second axis, and the first axis is not parallel to the second axis; and
- a ball, wherein the movable part forms a cavity, and the rotary member has a main body and a sleeve portion protruding from the main body, wherein the ball is received in the cavity and connected to the sleeve portion, wherein the cavity is recessed in a first direction that is perpendicular to the first axis and the second axis.

2. The driving mechanism as claimed in claim 1, wherein the first axis and the center of the optical element have a first distance, the second axis and the center of the optical element have a second distance, and the first distance is longer than the second distance.

3. The driving mechanism as claimed in claim 1, wherein when viewed along the first axis, the first axis does not extend through the optical element.

4. The driving mechanism as claimed in claim 1, wherein when viewed along the first axis, the second axis extends through the optical element.

5. The driving mechanism as claimed in claim 1, wherein the second axis is perpendicular to the first axis.

6. The driving mechanism as claimed in claim 1, further comprising a hinge pivotally connecting the movable part to the fixed part, wherein the fixed part forms a slot, and the hinge is rotatably received in the slot.

7. The driving mechanism as claimed in claim 1, wherein when viewed in the first direction or a second direction, the sleeve portion do not overlap the main body, wherein the first direction, the second direction, and the second axis are perpendicular to each other.

8. The driving mechanism as claimed in claim 1, further comprising a resilient element connected between the fixed part and the movable part, wherein the resilient element exerts a first main preload force on the movable part.

9. The driving mechanism as claimed in claim 8, wherein when viewed along the first axis, the movable part protrudes more than the fixed part on a front side of the driving mechanism.

10. The driving mechanism as claimed in claim 9, wherein the movable part forms a nub, and the fixed part forms a rib, wherein the resilient element connects the nub to the rib, and the nub protrudes more than the rib on the front side of the driving mechanism.

11. The driving mechanism as claimed in claim 9, wherein the first main preload force is perpendicular to the first and second axes.

12. The driving mechanism as claimed in claim 8, wherein the resilient element is connected to the rotary member, and when viewed along the second axis, the rotary member protrudes more than the movable part on a front side of the driving mechanism, and the resilient element exerts a first auxiliary preload force on the rotary member.

13. The driving mechanism as claimed in claim 12, wherein the movable part forms a nub, and the rotary member forms a protrusion, wherein the resilient element connects the nub to the protrusion, and the protrusion protrudes more than the nub on the front side of the driving mechanism.

14. The driving mechanism as claimed in claim 12, wherein the first auxiliary preload force is perpendicular to the first and second axes.

15. The driving mechanism as claimed in claim 8, wherein the resilient element comprises a metal spring sheet extending across the movable part and a rotary member.

16. The driving mechanism as claimed in claim 8, further comprising a damping element disposed on the resilient element.

17. The driving mechanism as claimed in claim 16, wherein the damping element is connected to at least one of the fixed part, the movable part, and the rotary member.

* * * * *